Patented Sept. 10, 1929.

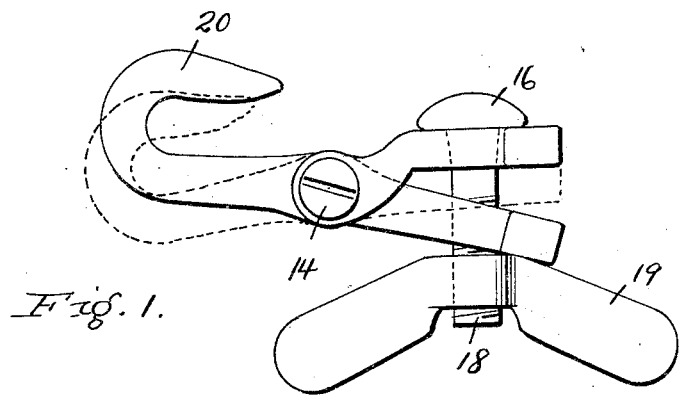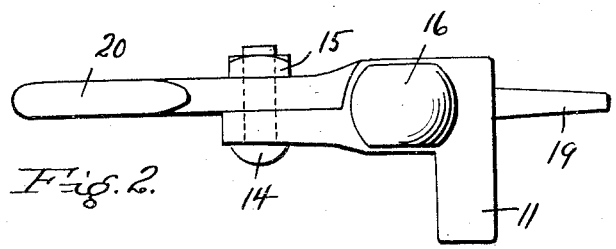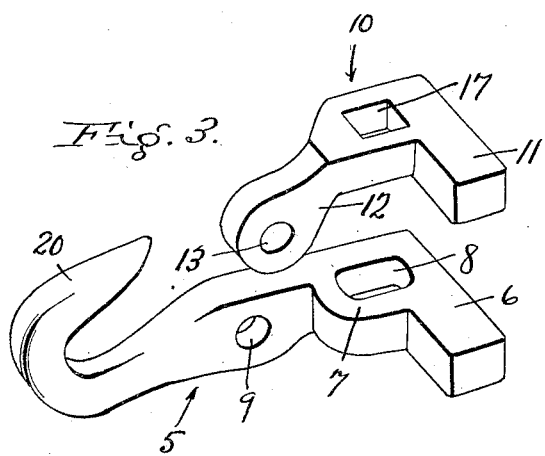

1,727,871

UNITED STATES PATENT OFFICE.

JOHN ENERSON, OF VALLEY CITY, NORTH DAKOTA.

WIRE STRETCHER.

Application filed April 23, 1929. Serial No. 357,580.

This invention relates to a wire stretcher and more particularly to a wire clamp, by means of which the wires, or wire of wire fences and the like, may be conveniently stretched.

The primary object of my invention is to provide a clamp for attachment to a wire, whereby the wire may be stretched, which clamp will securely grip the wire without injuring the wire, will be composed of but comparatively few parts, will be of simple, strong, durable and comparatively inexpensive construction, effective in use and otherwise well adapted for the purpose designed.

Other objects and advantages of the invention will become apparent during a study of the following description taken in connection with the accompanying drawings, wherein:

Figure 1 is a side view showing my improved clamp.

Figure 2 is a top plan view of the same.

Figure 3 is a perspective showing the parts of the clamp detached.

When reference is had to the drawings it will be seen that my improved clamp comprises a hook shaped member designated generally as at 5, which hook shaped member terminates at one end in a laterally extending projection 6.

It will be noted that the member 5 is enlarged as at 7 and is provided with an aperture 8 formed in the said enlarged portion. A transversely extending bore 9 is also formed in the hook member 5 adjacent the ends of the member, the purpose of which will be hereinafter more fully set forth.

A second member designated generally as at 10 is provided with a laterally extending projection 11 at one end and at its other end is offset as at 12 and is provided in the offset portion with a transversely extending bore 13.

In practice the member 10 is braced upon the end of the hook shaped member 5 so that the bores 9 and 13 are brought into alinement, and a bolt 14 is passed through said bores to be held in place by a nut 15, to provide a pivotal connection between the members 5 and 10. When the members 5 and 10 are so disposed with relation to each other it will be seen that the projections 6 and 11 will be in substantially the same plane and provide clamping jaws between which wires may be placed and securely held therebetween by means of a bolt 16 which passes through an aperture 17 formed in the member 10 and the aperture 8 formed in the member 5, as shown to advantage in Figure 1 of the drawings, which bolt is screw threaded as at 18 to receive a winged clamp nut 19, which latter when screwed down forces the projections 6 and 11 into close contact to effectually hold the wire therebetween.

When in use the wire to be stretched is clamped between the projections 6 and 11 with the hook portions 20 of the hook member 5 extending in a direction corresponding to the line of pull, and the wing nut 19 screwed down to force the outer end of the member 5 and the member 10 in tightly clamped relation. This will permit of a straight longitudinal pull upon the wire to be stretched.

My improved wire stretcher is preferably composed of metal, and from the foregoing it is seen to compose but few parts, which can be readily and easily assembled, and otherwise well adapted for the purpose intended.

Even though I have herein shown and described the invention as consisting of certain detail structural elements it is nevertheless to be understood that some changes may be made therein without affecting the spirit and scope of the appended claims.

Having thus described the invention, what I claim as new and desire to secure by Letters Patent is:—

1. In a device of the character described, a pair of complemental members, laterally extending projections formed on one end of each of said members, one of said members being relatively long and terminating at its opposite end in a hook, and the other of said members being relatively short, and the inner end of said last mentioned member being offset, said last mentioned member being pivotally associated at its offset portion with the first mentioned member adjacent one end thereof, whereby the same may be disposed on said longer member with the lateral projection of both of said members disposed in the same plane, to provide clamping jaws, and means for holding the jaws in clamped relation.

2. In a device of the character described, a pair of complemental members, laterally projecting members formed on one end of each of said members, one of said members being relatively long and terminating at its opposite end in a hook, and the other of said members being relatively short, the inner end of said last mentioned member being offset, and said last mentioned member being pivotally associated at its offset portion with the first mentioned member adjacent one end thereof, whereby the same may be disposed on said longer member with the lateral projections of both of said members disposed in the same plane to provide clamping jaws, said members adjacent their lateral extensions being provided with an aperture, a bolt passing through the aperture, and a wing nut threaded on one end of the bolt for holding the projections in clamped relation.

In testimony whereof I affix my signature.

JOHN ENERSON.